United States Patent
Blasius

(10) Patent No.: US 11,492,216 B2
(45) Date of Patent: Nov. 8, 2022

(54) PALLETISING SYSTEM AND METHOD FOR OPERATING A PALLETISING SYSTEM

(71) Applicant: Koerber Supply Chain Automation Eisenberg GmbH, Eisenberg (DE)

(72) Inventor: Christopher Blasius, Boerrstadt (DE)

(73) Assignee: Koerber Supply Chain Automation Eisenberg GmbH, Eisenberg (DE)

(*) Notice: Subject to any disclaimer, the term of this patent is extended or adjusted under 35 U.S.C. 154(b) by 0 days.

(21) Appl. No.: 17/269,375

(22) PCT Filed: Aug. 15, 2019

(86) PCT No.: PCT/EP2019/071948
§ 371 (c)(1),
(2) Date: Feb. 18, 2021

(87) PCT Pub. No.: WO2020/038827
PCT Pub. Date: Feb. 27, 2020

(65) Prior Publication Data
US 2021/0198056 A1    Jul. 1, 2021

(30) Foreign Application Priority Data
Aug. 21, 2018  (DE) ...................... 10 2018 214 047.2

(51) Int. Cl.
*B65G 61/00* (2006.01)
*B65G 57/24* (2006.01)
*B65G 47/52* (2006.01)

(52) U.S. Cl.
CPC ............. *B65G 61/00* (2013.01); *B65G 57/24* (2013.01); *B65G 47/52* (2013.01); *B65G 2203/0225* (2013.01); *B65H 2301/42256* (2013.01)

(58) Field of Classification Search
CPC ........ B65G 61/00; B65G 57/24; B65G 47/52; B65G 2203/0225; B65G 57/06; B65H 2301/42256
See application file for complete search history.

(56) References Cited

U.S. PATENT DOCUMENTS 5,263,813 A * 11/1993 Kiederle ............... B65G 47/90
414/908
5,348,440 A    9/1994 Focke
(Continued)

FOREIGN PATENT DOCUMENTS

CH        556008      11/1974
DE       19943800      3/2001
(Continued)

OTHER PUBLICATIONS

International Search Report for PCT/EP2019/07948, dated Jul. 9, 2020.
(Continued)

*Primary Examiner* — Lynn E Schwenning
(74) *Attorney, Agent, or Firm* — Dority & Manning, P.A.

(57) ABSTRACT

The invention relates to a palletizing apparatus for setting down article layers on a transport aid, the palletizing apparatus including a lifting apparatus which is configured in the form of a column and has at least three sides and at least three separate guide devices, wherein one of the at least three guide devices is arranged on each side, and wherein at least one carriage is guided on each of the three guide devices so as to be movable in a vertical direction (Z). Here, the at least three sides are oriented parallel to the vertical direction (Z) and in an inclined manner with respect to one another, wherein at least two of the angles (A1, A2, A3) between the three sides are angles other than 90°. The
(Continued)

invention also relates to a method for operating a palletizing apparatus for setting down an article layer on a transport aid.

16 Claims, 4 Drawing Sheets

(56) References Cited

U.S. PATENT DOCUMENTS

| | | | | |
|---|---|---|---|---|
| 5,683,222 | A * | 11/1997 | Ingelhag | B65G 59/023 414/801 |
| 7,850,415 | B2 * | 12/2010 | Blanc | B65G 57/24 414/791.1 |
| 8,813,942 | B2 * | 8/2014 | Machida | G02B 21/26 198/347.1 |
| 8,814,492 | B2 | 8/2014 | Perl | |
| 9,511,956 | B2 * | 12/2016 | Bianchi | B65G 61/00 |
| 9,731,916 | B2 | 8/2017 | Kollmuss et al. | |
| 9,908,721 | B2 | 3/2018 | Petrovic | |
| 10,442,638 | B2 * | 10/2019 | Kollmuss | B65G 47/086 |
| 10,569,957 | B2 * | 2/2020 | Nakamoto | B65G 41/005 |
| 2012/0002277 | A1 | 1/2012 | Machida et al. | |
| 2014/0294553 | A1 | 10/2014 | Petrovic | |
| 2018/0229948 | A1 | 8/2018 | Kollmuss et al. | |

FOREIGN PATENT DOCUMENTS

| | | |
|---|---|---|
| DE | 102011088849 | 6/2013 |
| DE | 102015206124 | 10/2016 |
| EP | 2537783 | 12/2012 |
| EP | 2547612 | 1/2013 |
| EP | 2653417 | 10/2013 |

OTHER PUBLICATIONS

International Preliminary Report on Patentability for PCT/EP2019/071948 dated Feb. 23, 2021.

* cited by examiner

PALLETISING SYSTEM AND METHOD FOR OPERATING A PALLETISING SYSTEM

The invention relates to a palletizing apparatus for setting down article layers on a transport aid, for example a pallet, or on a layer stack located on the transport aid, comprising a lifting apparatus which is configured in the form of a column and has at least three sides, and which has at least three separate guide devices, wherein, on at least three sides, in each case one of the at least three guide devices is arranged, and wherein, on at least three guide devices, in each case at least one carriage is guided so as to be movable in a vertical direction. The invention also relates to a method for operating a corresponding palletizing apparatus for setting down an article layer on a transport aid or on a layer stack located on the transport aid.

PRIOR ART

A palletizing apparatus is used to arrange articles, in particular piece goods, or containers for transport on transport aids, in particular pallets. To this end, the articles are, for example, initially combined into individual article layers and then set down in layers on the transport aid, or on a layer stack already located on the transport aid. In order to be palletized, the articles normally pass initially through a feed apparatus, in which the articles, which initially arrive in one or more rows one after another, are rearranged and/or assembled into stackable article layers. The stackable article layers are then transferred successively to the palletizing apparatus, which sets down the article layers on a desired stacking location, in particular on a transport aid.

To this end, the palletizing apparatus comprises for example a lifting apparatus to which a plurality of carriages are attached so as to be movable in a vertical direction. Fastened to one of these carriages is, for example, a set-down apparatus. During palletization, in each case one stackable article layer is transported onto a transport face of the set-down apparatus and the carriage with the set-down apparatus is moved vertically on the lifting apparatus. Subsequently, the article layer is set down on the layer stack. The bottommost article layer of a layer stack is in this case set down directly on the transport aid.

A generic palletizing apparatus is known for example from the document DE 10 2014 223 319 A1. The palletizing apparatus comprises a lifting mechanism column with three separate guide devices, which are arranged on different sides of the lifting mechanism column. On each of the guide devices, in each case one transfer station is guided so as to be movable vertically.

The document EP 2 610 197 A1 discloses a palletizing apparatus which comprises a lifting apparatus to which two carriages are attached so as to be movable vertically. In that case, a conveyor belt is arranged on one carriage and a set-down apparatus is arranged on the other carriage. During palletization, an article layer is conveyed by the conveyor belt onto the bottom face of the set-down apparatus.

The document US 2014/0294553 A1 also discloses a palletizing apparatus which comprises a lifting apparatus to which two carriages are attached so as to be movable vertically. In that case, a conveyor belt is arranged on one carriage and a set-down apparatus is arranged on the other carriage.

A palletizing apparatus is also known from the document EP 2 881 347 B1. The palletizing apparatus comprises a lifting mechanism column with two separate guide devices. In that case, a transfer station is guided so as to be movable vertically on one guide device and a loading station is guided so as to be movable vertically on the other guide device.

The documents DE 10 2007 022 908 A1, EP 2 842 895 A1, DE 41 14 215 A1, EP 2 653 417 A1, DE 199 43 800 A1, DE 10 2015 206 124 A1, DE 10 2011 088 849 A1 and EP 2 547 612 B1 also disclose palletizing apparatuses and methods for palletizing article layers.

Problem

The problem addressed by the present invention is that of improving a palletizing apparatus of the type mentioned at the beginning. In particular, the problem addressed by the invention is that of reducing the space requirement and increasing the flexibility in designing the layout.

SOLUTION

This problem is solved by a palletizing apparatus having the features of claim 1. Advantageous configurations and developments of the invention are the subject matter of the dependent claims.

A generic palletizing apparatus for setting down article layers on a transport aid or on a layer stack located on the transport aid comprises a lifting apparatus which is configured in the form of a column and has at least three sides. The column extends in this case in a vertical direction and is configured advantageously as a straight prism. The transport aid is, for example, a pallet.

The lifting apparatus has at least three separate guide devices, wherein, on at least three sides of the lifting apparatus, in each case one of the at least three guide devices is arranged, and wherein, on at least three guide devices, in each case at least one carriage is guided so as to be movable in the vertical direction. Thus, in each case one carriage is arranged on at least three sides of the lifting apparatus.

According to the invention, the at least three sides of the lifting apparatus are oriented parallel to the vertical direction and in an inclined manner with respect to one another, wherein in each case two sides enclose an angle between one another. In this case, at least two of the angles between in each case two of the three sides are other than 90°. Preferably, each of the three angles between in each case two of the three sides are other than 90°.

In particular, the lifting apparatus thus has a cross section that differs from a rectangle. The lifting apparatus thus has a shape that is different than a cuboid. In particular, the sides of the lifting apparatus on which the guide devices are arranged are not sides of a cuboid. For example, the lifting apparatus has a substantially triangular cross section. In this case, the three sides can form, with corresponding extensions in directions at right angles to the vertical direction, a triangular cross section. For example, the lifting apparatus has exactly three sides, wherein, on each side, exactly one guide device is arranged, on which in each case one carriage is guided.

Since only a column-like lifting apparatus is provided in order to move three components of the palletizing apparatus in the vertical direction on in each case one carriage, material, in particular in the form of steel, is advantageously saved. As a result of the substantially triangular cross section of the column-like lifting apparatus, the space requirement for the lifting apparatus is also advantageously reduced. It has been shown that, with a lifting apparatus in the form of a prism with a substantially triangular cross section, sufficiently high stability and load-bearing strength are achievable.

The angles between the sides on which the guide devices are arranged lie in a plane that is defined by a longitudinal direction and a transverse direction. In the case of an operating palletizing apparatus, the longitudinal direction and the transverse direction each extend horizontally, i.e. parallel to a floor on which the palletizing apparatus is standing. The vertical direction extends vertically with respect to the floor and at right angles to the longitudinal direction and at right angles to the transverse direction.

According to a preferred configuration of the invention, each of the angles between in each case two of the sides on which the guide devices are arranged lie in a range between 1° and 89°. Particularly preferably, each of the angles between in each case two of the sides on which the guide devices are arranged lie in a range between 50° and 70°. In particular, the lifting apparatus can have a cross section in the form of an equilateral triangle, wherein all of said angles are 60°.

According to an advantageous configuration of the invention, each of the carriages that are movably guided on the guide devices is assigned a separate drive for moving in the vertical direction. In addition, the carriages are advantageously movable in the vertical direction independently of one another.

According to one advantageous development of the invention, a set-down apparatus is fastened to a first carriage, which is arranged on a first side of the lifting apparatus, and is movable in the vertical direction with the first carriage. The set-down apparatus defines a transport face for transporting an article layer in the longitudinal direction. The set-down apparatus is configured for example in the form of a set-down belt and comprises a circulating conveyor belt.

Preferably, the set-down apparatus is in this case movable in the longitudinal direction relative to the first carriage, and thus also relative to the lifting apparatus, between a first longitudinal position and a second longitudinal position.

According to a further advantageous development of the invention, a compressing apparatus is fastened to a second carriage, which is arranged on a second side of the lifting apparatus, and is movable in the vertical direction with the second carriage. The compressing apparatus serves in this case to orient an article layer that is located on the transport face of the set-down apparatus.

According to a preferred configuration of the invention, the compressing apparatus is in this case fastened to the second carriage by means of a second fastening arm, wherein the second fastening arm passes through a plane defined by the first side. The plane defined by the first side extends in this case in the vertical direction and in the longitudinal direction, wherein the first side lies in this plane. The plane defined by the first side thus extends at right angles to the transverse direction.

Preferably, the compressing apparatus has at least one front-side stop and one rear-side stop. In this case, when the set-down apparatus is located in the first longitudinal position, the transport face of the set-down apparatus is arranged in a manner offset in the longitudinal direction with respect to the compressing apparatus. When the set-down apparatus is located in the second longitudinal position, an article layer located on the transport face of the set-down apparatus is arranged between said stops of the compressing apparatus in the longitudinal direction.

According to a further advantageous development of the invention, a transfer apparatus is fastened to a third carriage, which is arranged on a third side of the lifting apparatus, and is movable in the vertical direction with the third carriage.

The transfer apparatus defines a conveying face for transporting an article layer in the longitudinal direction. The transfer apparatus is configured for example in the form of a transfer belt and comprises a circulating conveyor belt.

According to a preferred configuration of the invention, the transfer apparatus is in this case fastened to the third carriage by means of a third fastening arm, wherein the third fastening arm passes through a plane defined by the first side. The plane defined by the first side extends in this case in the vertical direction and in the longitudinal direction, wherein the first side lies in this plane. The plane defined by the first side thus extends at right angles to the transverse direction.

Preferably, when the set-down apparatus is located in the first longitudinal position, the transport face of the set-down apparatus is arranged immediately next to the conveying face of the transfer apparatus, such that an article layer located on the conveying face is able to be transported in the longitudinal direction onto the transport face. When the set-down apparatus is located in the second longitudinal position, the transport face of the set-down apparatus is arranged in a manner offset in the longitudinal direction with respect to the conveying face of the transfer apparatus.

A method for operating a palletizing apparatus for setting down an article layer on a transport aid or on a layer stack located on the transport aid, having the features of claim 15, is also proposed. The palletizing apparatus in this case comprises a lifting apparatus which has at least three separate guide devices, wherein, on at least three guide devices, in each case at least one carriage is guided so as to be movable in a vertical direction. Said palletizing apparatus is in particular a palletizing apparatus according to the invention, which is described above.

The method according to the invention for operating a palletizing apparatus comprises the following steps.

First of all, a first carriage, on which a set-down apparatus is arranged, which defines a conveying face for transporting the article layer in the longitudinal direction, is moved in the vertical direction to a predefined height position. This height position is determined such that the transport face of the set-down apparatus is located slightly above the transport aid or the layer stack located on the transport aid. The set-down apparatus is configured for example in the form of a set-down belt and comprises a circulating conveyor belt.

Likewise, a second carriage, on which a compressing apparatus for orienting an article layer located on the transport face of the set-down apparatus is arranged, which has at least one front-side stop and one rear-side stop, is moved in the vertical direction to a predefined height position. This height position is determined such that the compressing apparatus is located above the transport face of the set-down apparatus.

Furthermore, an article layer is conveyed onto a transfer apparatus, which is attached to a third carriage, and which defines a conveying face for transporting the article layer in the longitudinal direction. The transfer apparatus is configured for example in the form of a transfer belt and comprises a circulating conveyor belt. The article layer is conveyed in particular by a feed apparatus onto the conveying face of the transfer apparatus.

Subsequently, the third carriage is moved to a predefined height position. This height position is determined such that the conveying face of the transfer apparatus is located at the same height as the transport face of the set-down apparatus.

Then, the article layer is transported from the conveying face of the transfer apparatus onto the transport face of the set-down apparatus, while the set-down apparatus is located in a first longitudinal position in which the set-down apparatus is arranged immediately next to the transfer apparatus in the longitudinal direction.

Then, the set-down apparatus is moved in the longitudinal direction relative to the first carriage to a second longitudinal position, in which the article layer located on the transport face of the set-down apparatus is arranged between the stops of the compressing apparatus in the longitudinal direction.

For example, at this time, the compressing apparatus is located in a height position in which the two stops of the compressing apparatus are located above the article layer located on the transport face of the set-down apparatus. In this case, the compressing apparatus is now moved downward in the vertical direction until the article layer located on the transport face is located at the height of the stops in the vertical direction.

Alternatively, at this time, the compressing apparatus is located in a height position in which the front-side stop of the compressing apparatus is already located at the height of the article layer located on the transport face of the set-down apparatus. In this case, the rear-side stop of the compressing apparatus is moved from a standby position, in which the rear-side stop is located above the article layer in the vertical direction, into a working position, in which the rear-side stop is located at the height of the article layer in the vertical direction.

The article layer located on the transport face of the set-down apparatus is now located between the stops in the longitudinal direction and at the height of the stops in the vertical direction. Now, the set-down apparatus is moved in the longitudinal direction relative to the first carriage back to the first longitudinal position. In the process, the article layer is set down on the transport aid or on the layer stack located on the transport aid.

When the set-down apparatus has a circulating conveyor belt, the movement of the set-down apparatus in the longitudinal direction relative to the first carriage to the first longitudinal position can be synchronized with the circulation of the conveyor belt such that the set-down apparatus travels out from under the article layer.

FIGURES AND EMBODIMENTS OF THE INVENTION

The invention is explained in more detail in the following text on the basis of an advantageous exemplary embodiment illustrated in the figures. The invention is not limited to this exemplary embodiment, however. The figures illustrate the subject matter of the invention only schematically. In the figures.

Figure 1:
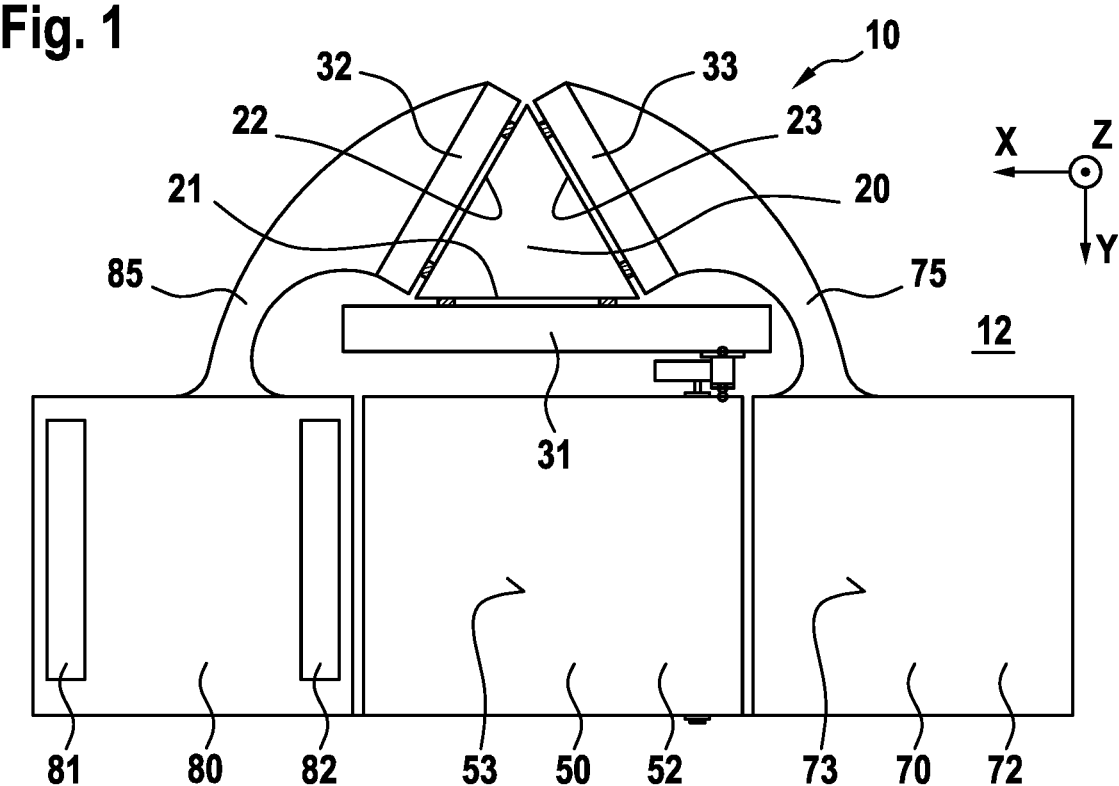
FIG. 1 shows a plan view of a palletizing apparatus.

FIG. 1 shows a schematic plan view of a palletizing apparatus 10. The palletizing apparatus 10 stands on a floor 12 and serves to set down goods, in particular article layers 15 (not illustrated here), on a layer stack 100 (not illustrated here) that is located on a transport aid 105 (not illustrated here).

The palletizing apparatus 10 comprises a lifting apparatus 20, which extends substantially in a vertical direction Z away from the floor 12. The vertical direction Z extends at right angles to the floor 12 and at right angles to a longitudinal direction X. A transverse direction Y extends at right angles to the vertical direction Z and at right angles to the longitudinal direction X.

The lifting apparatus 20 is configured in the form of a column and has, in the present case, three sides, specifically a first side 21, a second side 22 and a third side 23. The lifting apparatus 20 is in this case configured as a straight prism and has a triangular cross section. The first side 21 of the lifting apparatus 20 defines a plane that extends in the vertical direction Z and in the longitudinal direction X, wherein the first side 21 lies in this plane. The plane defined by the first side 21 thus extends at right angles to the transverse direction Y.

A first guide device 41 is arranged on the first side 21 of the lifting apparatus 20. On the first guide device 41, a first carriage 31 is guided so as to be movable in the vertical direction Z. A second guide device 42 is arranged on the second side 22.

On the second guide device 42, a second carriage 32 is guided so as to be movable in the vertical direction Z. A third guide device 43 is arranged on the third side 23.

On the third guide device 43, a third carriage 33 is guided so as to be movable in the vertical direction Z.

The guide devices 41, 42, 43 are configured for example in the form of in each case two mutually spaced-apart guide rails, which extend in the vertical direction Z. Each of the carriages 31, 32, 33, which are movably guided on the guide devices 41, 42, 43, is assigned in each case one separate drive (not illustrated here) for moving in the vertical direction Z. In particular, the carriages 31, 32, 33 are movable independently of one another in the vertical direction Z.

Fastened to the first carriage 31 is a set-down apparatus 50. The set-down apparatus 50 is movable in the vertical direction Z relative to the lifting apparatus 20 with the first carriage 31. The set-down apparatus 50 is additionally movable in the longitudinal direction X between a first longitudinal position and a second longitudinal position relative to the first carriage 31 and relative to the lifting apparatus 20. In the illustration shown here, the set-down apparatus 50 is located in the first longitudinal position.

The set-down apparatus 50 is configured in the form of a set-down belt and comprises a circulating conveyor belt 52, which defines a transport face 53 for transporting an article layer 15 in the longitudinal direction X. The transport face 53 extends in a plane that is defined by the longitudinal direction X and the transverse direction Y. The vertical direction Z thus extends at right angles to the transport face 53.

Fastened to the second carriage 32 is a compressing apparatus 80. The compressing apparatus 80 is movable in the vertical direction Z relative to the lifting apparatus 20 with the second carriage 32. The compressing apparatus 80 serves to orient an article layer 15 that is located on the transport face 53 of the set-down apparatus 50. The compressing apparatus 80 is fastened to the second carriage 32 by means of a second fastening arm 85. The second fastening arm 85 passes through the plane defined by the first side 21 of the lifting apparatus 20.

The compressing apparatus 80 has a front-side stop 81 and a rear-side stop 82. In this case, when the set-down apparatus 50 is located in the first longitudinal position, the transport face 53 of the set-down apparatus 50 is arranged in a manner offset in the longitudinal direction X with respect to the compressing apparatus 80. When the set-down apparatus 50 is located in the second longitudinal position, an article layer 15 located on the transport face 53 of the set-down apparatus 50 is arranged between the two stops 81, 82 of the compressing apparatus 80 in the longitudinal direction.

Fastened to the third carriage 33 is a transfer apparatus 70. The transfer apparatus 70 is movable in the vertical direction Z relative to the lifting apparatus 20 with the third carriage 33. The transfer apparatus 70 is in this case fastened to the third carriage 33 by means of a third fastening arm 75. The third fastening arm 75 passes through the plane defined by the first side 21 of the lifting apparatus 20.

The transfer apparatus 70 is configured in the form of a transfer belt and comprises a circulating conveyor belt 72, which defines a conveying face 73 for transporting an article layer 15 in the longitudinal direction X. The conveying face 73 extends in a plane that is defined by the longitudinal direction X and the transverse direction Y. The vertical direction Z thus extends at right angles to the conveying face 73.

When the set-down apparatus 50 is located in the first longitudinal position, the transport face 53 of the set-down apparatus 50 is arranged immediately next to the conveying face 73 of the transfer apparatus 70, such that an article layer 15 located on the conveying face 73 is able to be transported in the longitudinal direction X onto the transport face 53. When the set-down apparatus 50 is located in the second longitudinal position, the transport face 53 of the set-down apparatus 50 is arranged in a manner offset in the longitudinal direction X with respect to the conveying face 73 of the transfer apparatus 70.

The first carriage 31, the second carriage 32 and the third carriage 33 are configured, and arranged on the sides 21, 22, 23 of the lifting apparatus 20, such that a collision-free movement of the carriages 31, 32, 33 in the vertical direction Z on the guide devices 41, 42, 43 is allowed. A collision of the carriages 31, 32, 33 with one of the fastening arms 75, 85 is also avoided.

As long as the set-down apparatus 50 is located in the first longitudinal position, a collision of the set-down apparatus 50, the transfer apparatus 70 and the compressing apparatus 80 with one another or with one of the carriages 31, 32, 33 or one of the fastening arms 75, 85 is also avoided. When the set-down apparatus 50 is located in the second longitudinal position, a collision of the set-down apparatus 50 with the compressing apparatus 80 is possible.

Figure 2:
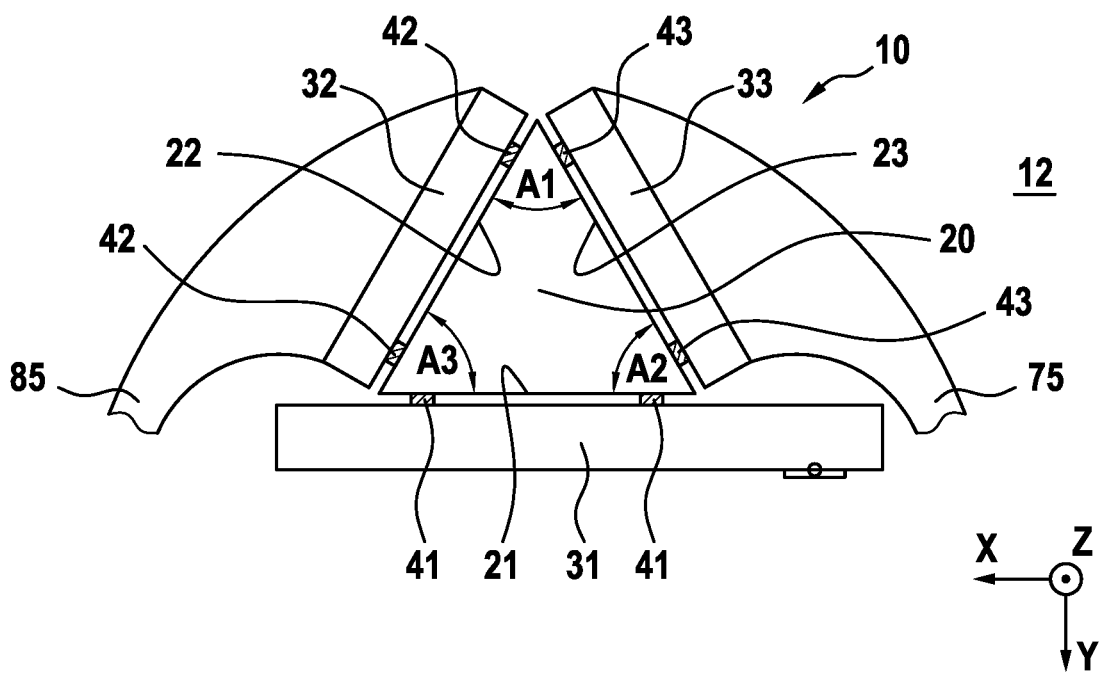
FIG. 2 shows an enlarged illustration of a subregion of FIG. 1.

FIG. 2 shows an enlarged illustration of a subregion of FIG. 1. The three sides 21, 22, 23 of the lifting apparatus 20 each extend parallel to the vertical direction Z and are oriented in an inclined manner with respect to one another. The second side 22 and the third side 23 enclose a first angle A1 between one another. The third side 23 and the first side 21 enclose a second angle A2 between one another. The first side 21 and the second side 22 enclose a third angle A3 between one another. The angles A1, A2, A3 between the sides 21, 22, 23 in this case lie in a plane that is defined by the longitudinal direction X and the transverse direction Y.

In the present case, the lifting apparatus 20 has a cross section in the form of an equilateral triangle. Thus, all the angles A1, A2, A3 between the sides 21, 22, 23 are exactly 60°. The lifting apparatus 20 can also have some other cross section, however. The angles A1, A2, A3 between the three sides 21, 22, 23, on which the guide devices 41, 42, 43 are arranged, can lie in a range between 1° and 89°. Preferably, each of the angles A1, A2, A3 lies in a range between 50° and 70°.

Figure 3:
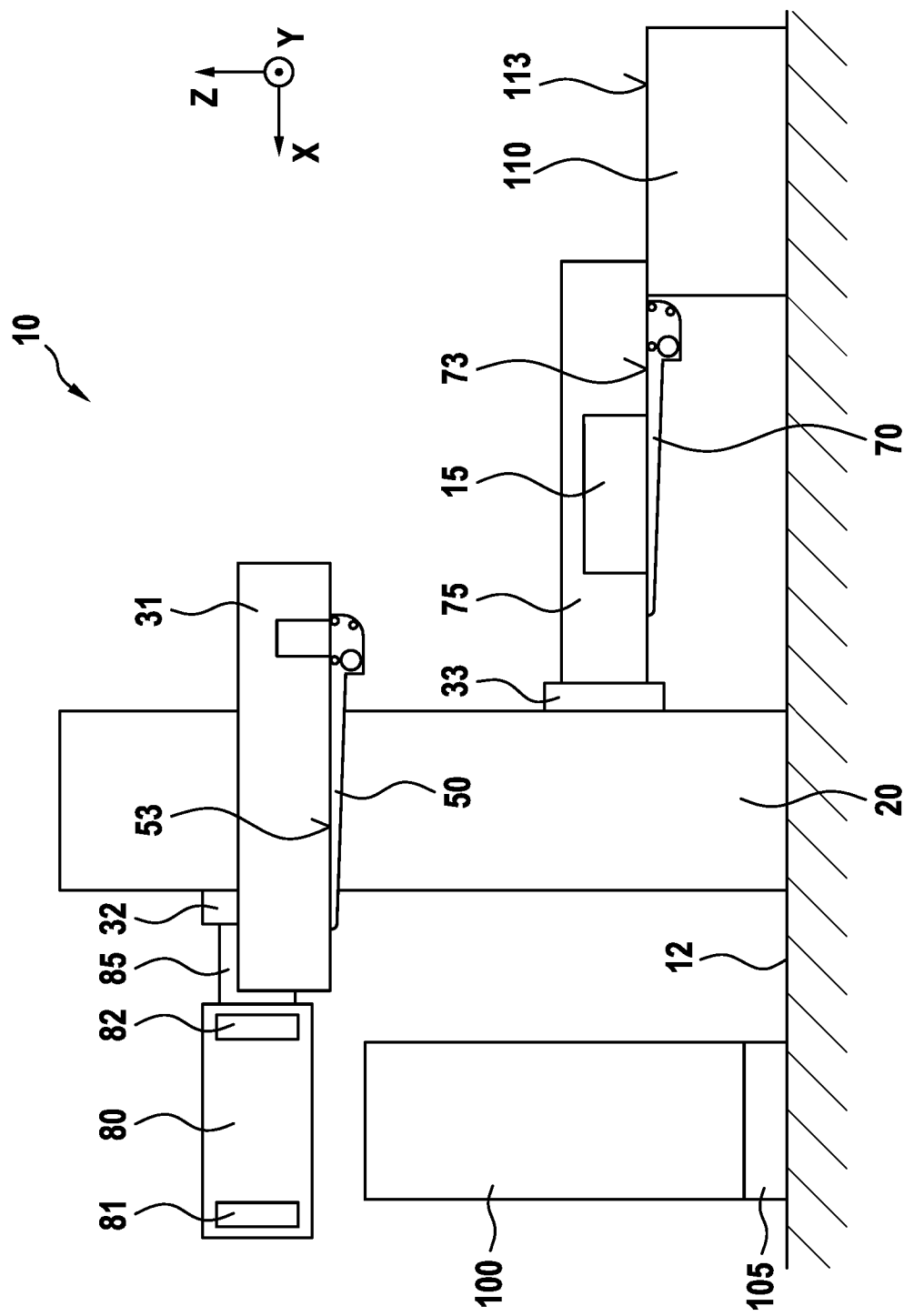
FIG. 3 shows a schematic front view of the palletizing apparatus from FIG. 1.

FIG. 3 shows a schematic front view of the palletizing apparatus 10 from FIG. 1. The article layers 15 are fed to the palletizing apparatus 10 by a feed apparatus 110. In this case, first of all individual goods are combined by the feed apparatus 110 into a stackable article layer 15, and the article layer 15 thus produced is subsequently transported further in the longitudinal direction X to the palletizing apparatus 10. The article layer 15 is set down by the palletizing apparatus 10 on the layer stack 100 that is already located on the transport aid 105. The transport aid 105 is for example a pallet and is located in the vertical direction Z beneath the compressing apparatus 80. A plurality of article layers 15 form the layer stack 100 on the transport aid 105. The article layer 15 is in this case initially conveyed by the feed apparatus 110 onto the conveying face 73 of the transfer apparatus 70.

In the illustration shown here, the transfer apparatus 70 is located in such a height position in the vertical direction Z that the conveying face 73 is aligned with a feeding face 113 of the feed apparatus 110. The article layer 15 is already located on the conveying face 73 of the transfer apparatus 70. The set-down apparatus 50 is located in the first longitudinal position. The set-down apparatus 50 is located in such a height position that the conveyor belt 52 is located slightly above the layer stack 100 located on the transport aid 105. The compressing apparatus 80 is located in a height position above the conveyor belt of the set-down apparatus 50.

Figure 4:
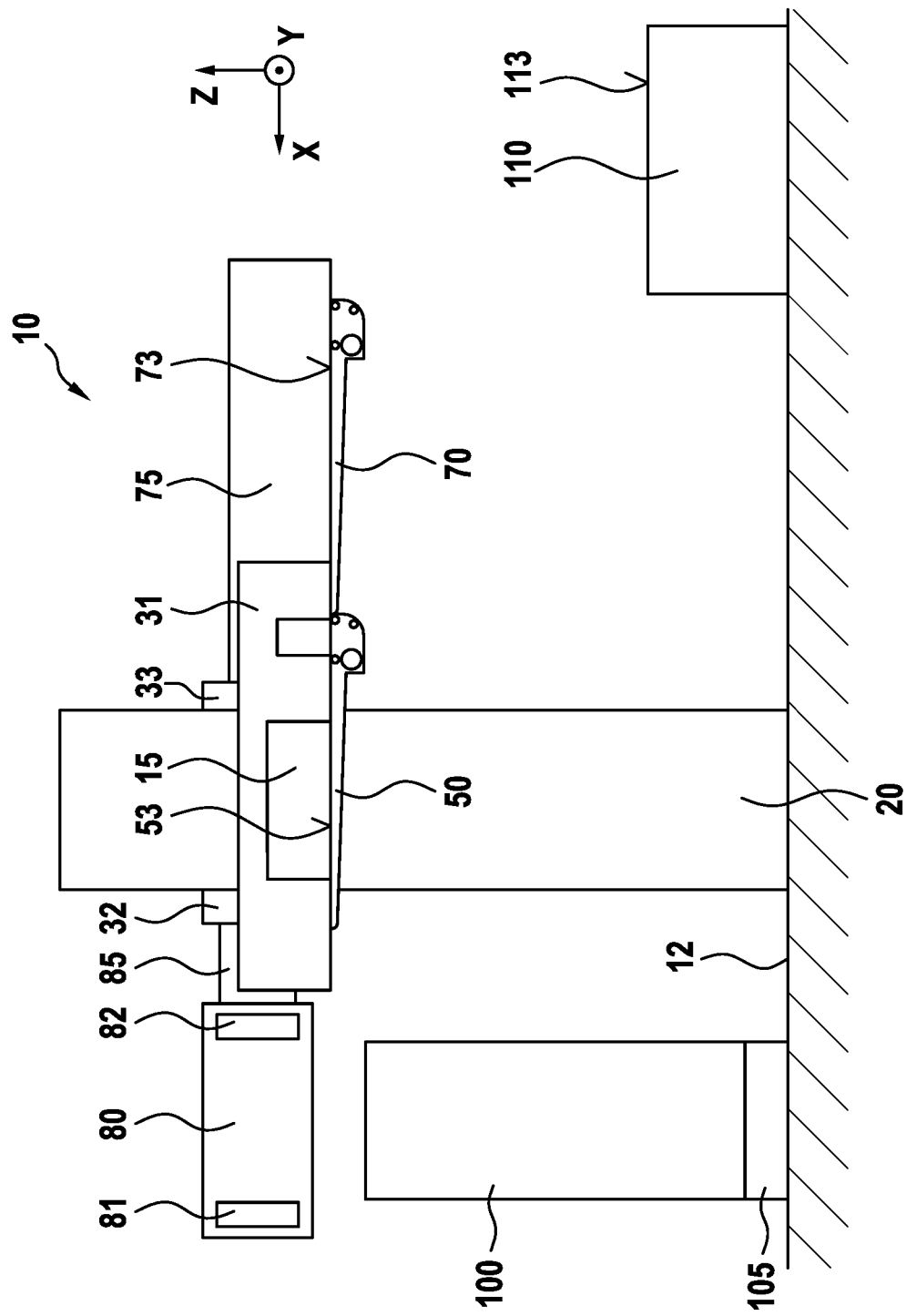
FIG. 4 shows a further schematic front view of the palletizing apparatus from FIG. 1.

FIG. 4 shows a further schematic front view of the palletizing apparatus 10 from FIG. 1. Proceeding from the situation in FIG. 3, the third carriage 33 is now moved with the transfer apparatus 70 to such a height position that the conveying face 73 is aligned with the transport face 53 of the set-down apparatus 50. Then, the article layer 15 is transported from the conveying face 73 onto the transport face 53.

In the illustration shown here, the transfer apparatus 70 is located in such a height position in the vertical direction Z that the conveying face 73 is aligned with the transport face 53 of the set-down apparatus 50. The article layer 15 is located on the transport face 53 of the set-down apparatus 50. The set-down apparatus 50 is located in the first longitudinal position. The set-down apparatus 50 is located in such a height position that the conveyor belt 52 is located slightly above the layer stack 100 located on the transport aid 105. The compressing apparatus 80 is located in a height position above the conveyor belt 52 of the set-down apparatus 50.

Figure 5:
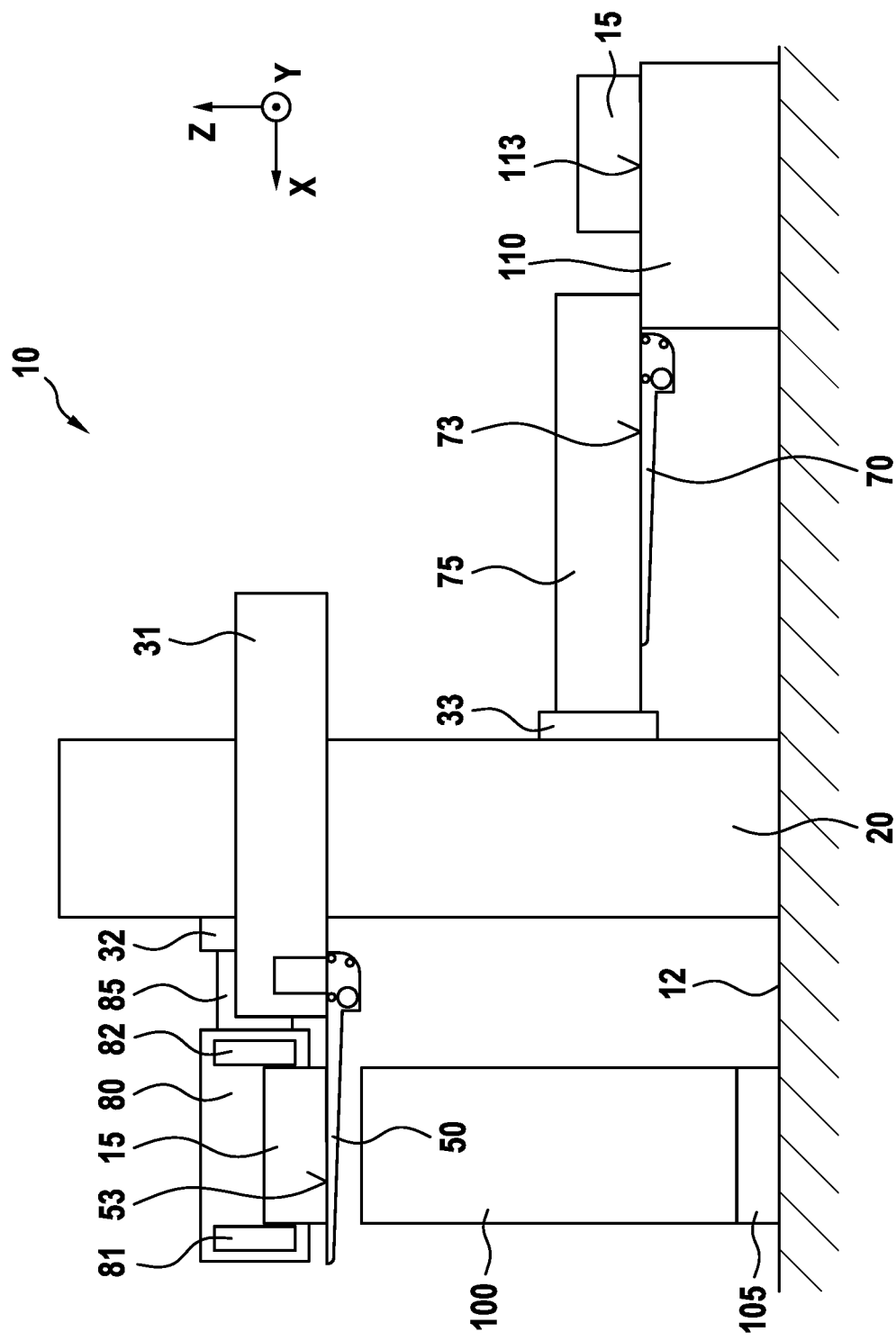
FIG. 5 shows a yet another schematic front view of the palletizing apparatus from FIG. 1.

FIG. 5 shows yet another schematic front view of the palletizing apparatus 10 from FIG. 1. Proceeding from the situation in FIG. 4, the set-down apparatus 50 is now moved into the second longitudinal position with the article layer 15. In the second longitudinal position, the transport face 53 of the set-down apparatus 50 is arranged directly beneath the compressing apparatus 80. Likewise, the third carriage 33 is moved with the transfer apparatus 70 to the height position in which the conveying face 73 is aligned with the feeding face 113 of the feed apparatus 110.

The compressing apparatus 80 can in this case be located in a height position in which the two stops 81, 82 are located above the article layer 15. In this case, after the set-down apparatus 50 has reached the second longitudinal position, the compressing apparatus 80 is moved downward in a vertical direction Z until the article layer 15 is located at the height of the two stops 81, 82 in the vertical direction.

The compressing apparatus 80 can also be located in a height position in which the front-side stop 81 is already are located at the height of the article layer 15. In this case, the rear-side stop 82 is located in a standby position, in which the rear-side stop 82 is located above the article layer 15 in the vertical direction Z. In this case, after the set-down apparatus 50 has reached the second longitudinal position, the rear-side stop 82 is moved into a working position in which the rear-side stop 82 is located at the height of the article layer 15 in the vertical direction Z.

In the illustration shown here, the transfer apparatus 70 is located in such a height position in the vertical direction Z that the conveying face 73 is aligned with the feeding face 113 of the feed apparatus 110. Already located on the feeding face 113 of the feed apparatus 110 is a further article layer 15, which is conveyed onto the conveying face 73.

The set-down apparatus 50 is located in the second longitudinal position. The set-down apparatus 50 is located in such a height position that the conveyor belt 52 is located slightly above the layer stack 100 located on the transport aid 105. The compressing apparatus 80 is located in a height position above the conveyor belt 52 of the set-down apparatus 50.

The article layer 15 is located on the transport face 53 of the set-down apparatus 50 and projects into the compressing apparatus 80. The article layer 15 is located between the stops 81, 82 of the compressing apparatus 80 in the longitudinal direction X and at the height of the stops 81, 82 in the vertical direction Z.

Now, the set-down apparatus 50 is moved in the longitudinal direction X back to the first longitudinal position. The movement of the set-down apparatus 50 in the longitudinal direction X to the first longitudinal position and the circulation of the conveyor belt 52 are in this case synchronized such that the set-down apparatus 50 travels out from under the article layer 15. As a result, the article layer 15 is set down on the layer stack 100 located on the transport aid 105. As a result, the layer stack 100 is higher by the height of the article layer 15.

Subsequently, the first carriage 31 with the set-down apparatus 50 and the second carriage 32 with the compressing apparatus 80 are moved upward in the vertical direction Z by the height of the article layer 15 into the height position described with respect to FIG. 3. The further article layer 15 located on the feeding face 113 of the feed apparatus 110 is transported to the palletizing apparatus 10 and conveyed onto the conveying face 73 of the transfer apparatus 70, as illustrated in FIG. 3.

When the layer stack 100 comprises a particular amount of article layers 15 and has a particular height, the layer stack 100 is removed together with the transport aid 105. A further transport aid 105, for example a pallet, is arranged under the compressing apparatus 80, and further article layers 15 are set down on the further transport aid 105 and stacked, with the result that a further layer stack 100 is formed.

The invention is not limited to the exemplary embodiments described here and the aspects highlighted therein. Rather, a large number of modifications that lie within the capabilities of a person skilled in the art are possible within the scope defined by the claims.

LIST OF REFERENCE SIGNS

10 Palletizing apparatus
12 Floor
15 Article layer
20 Lifting apparatus
21 First side
22 Second side
23 Third side
31 First carriage
32 Second carriage
33 Third carriage
41 First guide device
42 Second guide device
43 Third guide device
50 Set-down apparatus
52 Conveyor belt
53 Transport face
70 Transfer apparatus
72 Conveyor belt
73 Conveying face
75 Third fastening arm
80 Compressing apparatus
81 Front-side stop
82 Rear-side stop
85 Second fastening arm
100 Layer stack
105 Transport aid
110 Feed apparatus
113 Feeding face
X Longitudinal direction
Y Transverse direction
Z Vertical direction
A1 First angle
A2 Second angle
A3 Third angle

The invention claimed is:

1. A palletizing apparatus for setting down article layers on a transport aid, comprising a lifting apparatus which is configured in the form of a column and has at least three sides, and which has at least three separate guide devices, wherein, on the at least three sides, one of the at least three guide devices is arranged on each of the at least three sides, and wherein, on each of the at least three guide devices, at least one carriage is guided so as to be movable in a vertical direction (Z), wherein the at least three sides are oriented parallel to the vertical direction (Z) and in an inclined manner with respect to one another in a horizontal plane, wherein at least two angles (A1, A2, A3) between each adjacent two of the three sides are other than 90°.

2. The palletizing apparatus as claimed in claim 1, wherein each of the angles (A1, A2, A3) between each adjacent two of the sides lies in a range between 1° and 89°.

3. The palletizing apparatus as claimed in claim 2, wherein each of the angles (A1, A2, A3) between each adjacent two of the sides lies in a range between 50° and 70°.

4. The palletizing apparatus as claimed in claim 1, wherein each of the carriages is assigned a separate drive for moving in the vertical direction (Z).

5. The palletizing apparatus as claimed in claim 1, wherein each of the carriages are movable independently of one another in the vertical direction (Z).

6. The palletizing apparatus as claimed in claim 1, wherein the at least one carriage comprises a first carriage arranged on a first side and has a set-down apparatus fastened thereon, wherein the set-down apparatus defines a transport face for transporting an article layer in a longitudinal direction (X).

7. The palletizing apparatus as claimed in claim 6, wherein the set-down apparatus is configured in the form of a set-down belt and comprises a circulating conveyor belt.

8. The palletizing apparatus as claimed in claim 6, wherein the set-down apparatus is movable in the longitudinal direction (X), relative to the first carriage, between a first longitudinal position and a second longitudinal position.

9. The palletizing apparatus as claimed in claim 6, wherein the at least one carriage comprises a second carriage, wherein a compressing apparatus for orienting an article layer is fastened to the second carriage, which is arranged on a second side.

10. The palletizing apparatus as claimed in claim 9, wherein the compressing apparatus is fastened to the second carriage by a second fastening arm, which passes through a plane defined by the first side.

11. The palletizing apparatus as claimed in claim 10, wherein the at least one carriage comprises a third carriage, which is arranged on a third side, has a transfer apparatus fastened to it, which defines a conveying face for transporting an article layer in the longitudinal direction (X).

12. The palletizing apparatus as claimed in claim 11, wherein the transfer apparatus is configured in the form of a transfer belt and comprises a circulating conveyor belt.

13. The palletizing apparatus as claimed in claim 11, wherein the transfer apparatus is fastened to the third carriage by a third fastening arm, which passes through the plane defined by the first side.

14. The palletizing apparatus as claimed in claim 11, wherein the transport face of the set-down apparatus is arranged immediately next to the conveying face of the transfer apparatus such that an article layer located on the conveying face is able to be transported in the longitudinal direction (X) onto the transport face when the set-down apparatus is located in the first longitudinal position, and such that the transport face of the set-down apparatus is arranged in a manner offset in the longitudinal direction (X) with respect to the conveying face of the transfer apparatus when the set-down apparatus is located in the second longitudinal position.

15. The palletizing apparatus as claimed in claim 9, wherein the compressing apparatus has at least one front-side stop and one rear-side stop, wherein the transport face of the set-down apparatus is arranged in a manner offset in the longitudinal direction (X) with respect to the compressing apparatus when the set-down apparatus is located in a first longitudinal position, and wherein an article layer located on the transport face is arranged in the longitudinal direction (X) between the stops when the set-down apparatus is located in a second longitudinal position.

16. A method for operating a palletizing apparatus for setting down an article layer on a transport aid, wherein the palletizing apparatus comprises a lifting apparatus which has at least three separate guide devices, wherein, on each of the at least three guide devices, at least one carriage is guided so as to be movable in a vertical direction (Z), comprising the following steps of:
    moving a first carriage, on which a set-down apparatus is arranged, in the vertical direction (Z) to a first carriage predefined height position;
    moving a second carriage, on which a compressing apparatus for orienting the article layer is arranged, the compressing apparatus having at least one front-side stop and one rear-side stop, in the vertical direction (Z) to a second carriage predefined height position;
    conveying the article layer onto a transfer apparatus which is attached to a third carriage;
    moving the third carriage to a third carriage predefined height position;
    transporting the article layer from the transfer apparatus onto the set-down apparatus while the set-down apparatus is located in a first longitudinal position in which the set-down apparatus is arranged immediately next to the transfer apparatus in the longitudinal direction (X);
    moving the set-down apparatus in the longitudinal direction (X) relative to the first carriage to a second longitudinal position;
    moving the compressing apparatus in the vertical direction (Z) such that the article layer is arranged between the at least one front-side stop and one rear-side stop of the compressing apparatus in the longitudinal direction (X);
    moving the set-down apparatus in the longitudinal direction (X) relative to the first carriage to the first longitudinal position such that the set-down apparatus travels out from under the article layer, with the result that the article layer is set down on the transport aid or on a layer stack located on the transport aid.

* * * * *